United States Patent
Canright et al.

(10) Patent No.: US 7,844,595 B2
(45) Date of Patent: Nov. 30, 2010

(54) DOCUMENT SIMILARITY SCORING AND RANKING METHOD, DEVICE AND COMPUTER PROGRAM PRODUCT

(75) Inventors: Geoffrey Canright, Oslo (NO); Kenth Engo-Monsen, Fredrikstad (NO)

(73) Assignee: Telenor ASA, Fornebu (NO)

( * ) Notice: Subject to any disclaimer, the term of this patent is extended or adjusted under 35 U.S.C. 154(b) by 0 days.

(21) Appl. No.: 12/618,299

(22) Filed: Nov. 13, 2009

(65) Prior Publication Data
US 2010/0131515 A1 May 27, 2010

Related U.S. Application Data

(63) Continuation of application No. 11/349,235, filed on Feb. 8, 2006, now Pat. No. 7,689,559.

(51) Int. Cl.
*G06F 7/00* (2006.01)
*G06F 17/30* (2006.01)

(52) U.S. Cl. .................. 707/709; 707/736; 707/748

(58) Field of Classification Search .................. None
See application file for complete search history.

(56) References Cited

U.S. PATENT DOCUMENTS

| | | |
|---|---|---|
| 5,761,685 A | 6/1998 | Hutson |
| 5,895,470 A | 4/1999 | Pirolli et al. |
| 6,356,899 B1 | 3/2002 | Chakrabarti et al. |
| 6,457,028 B1 | 9/2002 | Pitkow et al. |
| 6,847,966 B1 | 1/2005 | Sommer et al. |
| 6,990,628 B1 | 1/2006 | Palmer et al. |
| 6,996,572 B1 | 2/2006 | Chakrabarti et al. |
| 7,152,065 B2 | 12/2006 | Behrens et al. |
| 7,185,001 B1 | 2/2007 | Burdick et al. |
| 7,257,577 B2 | 8/2007 | Fagin et al. |
| 2003/0003707 A1 | 1/2003 | Yamaha |
| 2003/0023570 A1 | 1/2003 | Kobayashi et al. |
| 2005/0262050 A1 | 11/2005 | Fagin et al. |
| 2006/0200556 A1 | 9/2006 | Brave et al. |

FOREIGN PATENT DOCUMENTS

WO WO 02/054289 A1 7/2002

OTHER PUBLICATIONS

Xiaodi Huang et al. "Identification of Clusters in the Web Graph Based on Link Topology"; Database Engineering and Applications Symposium, 2003, Proceedings, 7$^{th}$ International, Jul. 16-18, 2003; Piscataway, N.J., USA, IEEE, Jul. 16, 2003, pp. 117-122, XP010647158, ISBN: 0-7695-1981-4.

(Continued)

*Primary Examiner*—Jay A Morrison
(74) *Attorney, Agent, or Firm*—Oblon, Spivak, McClelland, Maier & Neustadt, L.L.P.

(57) ABSTRACT

A device, computer program product and a method for computing the similarity of a set of documents that avoids the large, wasted computational effort involved in calculating very small similarity scores by using thresholds to stop a similarity calculation between documents, thus ensuring that, with high probability, all document pairs with higher similarity than the thresholds have been found.

16 Claims, 9 Drawing Sheets

OTHER PUBLICATIONS

Richardo Baeza-Yates et al. "Relating Web Characteristics With Link Based Web Page Ranking", String Processing and Information Retrieval, 2001. SPIRE 2001. Proceedings 8$^{th}$ International Symposium on Nov. 13-15, 2001, Piscataway, N.J., USA, IEEE, Nov. 13, 2001, pp. 21-32, XP010583172, ISBN:0-7695-1192-9.

Zheng Chen et al. "A Unified Framework for Web Link Analysis", Web Information Systems Engineering, 2002. WISE 2002. Proceedings of the 3$^{rd}$ International Conference on Dec. 12-14, 2002, Piscataway, N.J., USA, IEEE, Dec. 12, 2002, pp. 63-70, XPO10632781, ISBN: 0-7695-1766-8.

Michaelangelo Diligenti, et al. "Web Page Scoring Systems for Horizontal and Vertical Search", Proceedings of the 11$^{th}$ International Conference on World Wide Web-WWW2002, May 7, 2002, pp. 508-516, XP002353433, Hawaii, USA, ISBN: 1-58113-449-5.

Brian D. Davison "Unifying Text and Link Analysis", 18$^{th}$ International Joint Conference on Intelligence, Online 2003, XP00235434 Bethlehem, PA, USA, Retrieved from the Internet URL: http://www.cs.cmu.edu.{dunja/TextLink2003/papers/DavisonTextLink2003/papers/Davison Text Link03.pdf>'retrieved on Nov. 10, 2005.

Henry Lieberman "Letizia: An Agent that Assists Web Browsing"; Media Laboratory, Proceedings of the 14$^{th}$ International Joint Conference on Artificial Intelligence (IJCAI-95); 1995; Massachusetts Institute of Technology.

Stuart K. Card et al., "The WebBook and the Web Forager: An Information Workspace for the World-Wide Web", Xerox Palo Alto Research Center; Apr. 13, 1996; pp. 111-113; CHI '96 Vancouver; XP 000657809.

He et al., "Web Document Clustering Using Hyperlink Structures", Computational Statistics and Data Analysis 41, (2002) 19-45.

Hou et al., "Web Page Clustering: A Hyperlink-Based Similarity and Matrix-Based Hierarchical Algorithms", APWEB 2003, LNCS 2642, pp. 201-212, 2003.

Xu et al., "Document Clustering Based on Non-Negative Matrix Factorization", SIGIR '03 Jul. 28-Aug. 1, 2003; Toronto, Canada.

Ando, "Latent Semantic Space: Iterative Scaling Improves Precision of Inter-document Similarity Measurement", SIGIR 2000; Jul. 2000, Athens, Greece.

Sasaki et al., "Web Document Clustering Using Threshold Selection Partitioning", Proceedings of NTCIR-4, Tokyo, Apr. 2003-Jun. 2004.

Similarity threshold - $\tau_{SIM}$

WordX ⟶ (DocX$_1$, DocX$_2$, DocX$_3$, DocX$_4$, ..., DocX$_N$)

| 1 | $SIM_{1,2}$ | $SIM_{1,3}$ | $SIM_{1,4}$ | ... | $SIM_{1,N}$ |
|---|---|---|---|---|---|
|   | 1 | $SIM_{2,3}$ | $SIM_{2,4}$ | ... | $SIM_{2,N}$ |
|   |   | 1 | $SIM_{3,4}$ | ... | $SIM_{3,N}$ |
|   |   |   | 1 | ⋱ | ... |
|   |   |   |   | 1 | $SIM_{N-1,N}$ |
|   |   |   |   |   | 1 |

Stop calculating in a row when
SIM(DocX$_{ROW}$, DocX$_{COLUMN}$) ≤ $\tau_{SIM}$

Figure 4

Score vectors $$(\alpha H + \beta S)\vec{x}_{\alpha H+\beta S} = \lambda_{\alpha H+\beta S}\vec{x}_{\alpha H+\beta S} \Rightarrow \text{Score } \vec{x}_{\alpha H+\beta S}$$

$$\left.\begin{array}{l} H\vec{x}_H = \lambda_H \vec{x}_H \\ S\vec{x}_S = \lambda_S \vec{x}_S \end{array}\right\} \Rightarrow \text{Score } a\vec{x}_H + b\vec{x}_S$$

Figure 5

DOCUMENT SIMILARITY SCORING AND RANKING METHOD, DEVICE AND COMPUTER PROGRAM PRODUCT

CROSS REFERENCE TO RELATED APPLICATIONS

This application is a continuation application of, and claims the benefit of priority under 35 U.S.C. §120 from, U.S. application Ser. No. 11/349,235, filed Feb. 8, 2006, which contains subject matter related to U.S. Pat. No. 7,281,005, issued on Oct. 9, 2007; U.S. Pat. No. 7,493,320, issued on Feb. 17, 2009; and co-pending application Ser. No. 11/227, 495 filed on Sep. 16, 2005, the contents of each being incorporated herein by reference.

BACKGROUND OF THE INVENTION

1. Field of Use

A computer implemented method and device for intelligent on-line document searching, similarity scoring and retrieval. In particular, an efficient method of calculating similarity scores between electronic documents. Also, a plurality of embodiments for combining a similarity graph and a hyperlink structure graph for ranking hit lists from searches over a set of electronic documents.

2. Description of the Background

The following discusses methods both for computing similarity scores of electronic documents and for performing link-based analysis of electronic documents.

Known methods for computing similarity scores of electronic documents (e.g., Mining the web—Discovering Knowledge from Hypertext Data, Soumen Chakrabarti, Morgan Kaufmann Publishers, 2003) are commonly based on normalized word frequencies. Such document similarity scores can serve many purposes. However, finding similarity scores for all document pairs (i.e., calculating the entire similarity matrix) of a large document set is not part of the state of the art, since conventional (brute force) methods are not able to cope with the computational burden engendered by a large document set. As we show below, the present invention offers a method for determining the whole similarity matrix efficiently. In order to give a complete view, the full procedure to be used in the determination of a similarity matrix of a document set is described below. It should be emphasized that this procedure is a preview of the way that the calculation is in fact performed; hence some of the steps are prior art, and some are novel. However it is convenient to describe the current state of the similarity technology in terms of the entire procedure. Hence, below, each step (denoted as A, B, C, D, and E) will be discussed in order, including its status in terms of prior art or novelty.

Step A—Build a corpus of words. A word corpus consists of the words that are considered important in the analysis. These words are stored in a form independent of the documents the words occur in. Substeps include:
  a. List all the unique words in all the documents considered.
  b. Remove stop-words (unimportant words) etc.
  c. Perform stemming to reduce the set of words admissible to the corpus.
  d. Perform other possible operations on the word corpus in order to decrease the size of the corpus (number of words).

The preprocessing step of building the corpus, as described here, is well known to any practitioner in the field.

Step B—Build a document description vector. Two choices are: building the document's word frequency vector, or mapping the document to a set of concepts. Concepts may be represented as weighted collections of words, and in this sense the two choices are common descriptions of the same document, but represented in different basis. For example, we can for each document $D_i$ build a word number vector $\vec{N}(D_i)$. Each element in the word number vector consists of an integer counting the number of times the corresponding word in the corpus vector occurs in the document $D_i$. It is also possible to give extra weight for word occurrences which imply more importance for the word, for example occurrences in the document's title, in bold text or italic text, etc.

The various choices for Step B, as described here, constitute known technology.

Step C—Normalize the document description vector. This step is optional, and does not need to be performed on the document description vectors. However, normalization will keep documents with many words from overwhelming documents with fewer words. In the example with the word number vector $\vec{N}(D_i)$ of document $D_i$, this can be normalized with respect to the size of the document. This is done as follows:

$$\vec{n}(D_i) = \frac{\vec{N}(D_i)}{\sum_j N_j(D_i)},$$

giving rise to the (normalized) word frequency vector $\vec{n}(D_i)$. Here the sum in the denominator is over all words j; hence the denominator is simply the total number of word occurrences found in the document (not counting words not in the corpus). Step C as described here is known to practitioners of the art.

Step D—Calculate a Similarity Score. The state of the art includes a number of methods for quantifying the similarity between two documents. Here we give an example method. In this example, the similarity score between two documents A and B is calculated based on the two documents' normalized word-frequency vectors:

$$s(A, B) = \sum_i \sqrt{n_i(A) n_i(B)}.$$

Other methods are used to calculate a similarity score, but this formula has the following useful properties: $s(A, A)=1$; $0 \leq s(A, B) \leq 1$; and $s(A, B)=s(B, A)$. The choice of formulae presented here is the one disclosed in the present inventors' co-pending application Ser. No. 11/227,495, and for the purposes of this invention is the preferred method for calculating a similarity score.

The three steps (steps B, C, and D) following the preprocessing step A are prior art. Any practitioner in the field will have to build some version of a document description vector for the corpus words in each document, and also define a measure of similarity between two such document description vectors.

Step E—Calculate a Similarity Matrix. This step is non-conventional, since to our knowledge no method has been presented for performing this determination efficiently. Based on the similarity scores calculated pair-wise among the documents, one can create a similarity matrix. Suppose we have a set of documents $\{D_i\}$, and the number of documents is m. Then the m×m symmetric similarity matrix S based on the document set $\{D_i\}$ is:

$$S = \begin{bmatrix} 1 & s(D_1, D_2) & s(D_1, D_3) & \ldots & s(D_1, D_m) \\ s(D_2, D_1) & 1 & s(D_2, D_3) & \ldots & s(D_2, D_m) \\ s(D_3, D_1) & s(D_3, D_2) & 1 & \ldots & s(D_3, D_m) \\ \vdots & \vdots & \vdots & \ddots & \vdots \\ s(D_m, D_1) & s(D_m, D_2) & s(D_m, D_3) & \ldots & 1 \end{bmatrix}$$

Step E is an extremely attractive goal in the field of document similarity computing, as it gives a global view of the textual relations among all documents in the document set. However, this goal is unattainable for large document sets, unless some good method for streamlining the calculation is found. That is, for large document sets, both the calculation time and the storage requirement grow as the square $m^2$ of the number of documents m. Hence, when the number of documents in the collection reaches millions or even billions, it is not feasible to calculate the similarity matrix using conventional methods. Thus, using known methods, it is practically impossible to use the information contained in the full similarity matrix, unless the document set is sufficiently small. We offer a solution to this problem, which is disclosed herein.

These previously identified methods perform machine evaluation of the 'importance' of electronic documents (e.g., conventional methods for ranking a hit list from a search over an interlinked document set) consist of two main activities:

1. Link analysis, in which the hyperlinked structure among the documents is analyzed to yield a link analysis score for the documents, based only on how they are positioned in the network which is formed by the links between the documents.
2. Text analysis. Each individual document is analyzed with regards to textual relevance as compared to the supplied search keywords to produce a text analysis score.

Conventional methods then combine the two scores (i.e., the link analysis score and the text analysis score) into one net score, which is used for ranking the documents.

Deficiencies with conventional methods for calculating similarity scores among a set of documents; and deficiencies with conventional methods for ranking hit lists from searches over an interlinked document set are discussed below.

As noted above, known methods for calculating similarity scores among a set of documents are very computationally intensive. In order to calculate the whole similarity matrix, one will need on the order of $m^2/2$ similarity computations, where m is the number of documents. This becomes a very daunting task when the number of documents in the document set reaches millions or even billions. Due to the fact that many of these similarity scores will also be zero (or very small), a lot of computational time is wasted on just calculating very small numbers (including zeros). This is clearly highly undesirable.

As an alternative to calculating the entire similarity matrix, one can choose to calculate similarities with respect to a single document of interest (hence calculating only one row of the matrix). This approach can be useful when one wishes to find documents which are similar to a given "working" document; and it gives a large saving in computational burden. However, this calculation must then be done in real time, when a suitable document of interest is chosen by the user.

Also, for a given document, one is mostly interested in only those documents which are most similar to the given document. Hence even in this case it would be of great benefit to be able to avoid calculating many small or zero similarity scores with respect to the given document. In the absence of a method for avoiding the calculation of these small scores, one uses known methods to find the similarity of all the other documents to the given document, in order to be sure that no highly similar documents have been overlooked. In short: (i) finding only similarities with respect to a working document can be useful for some purposes, but not for similarity-based link analysis; (ii) even when only this one row of the matrix is needed, it is useful to find efficient ways for only calculating the largest similarity scores, and avoiding calculation of small or zero scores.

Deficiencies associated with conventional methods for ranking hit lists from searches over an interlinked document set become clear when one looks carefully at how link analysis and text relevance are combined in the ranking of the search hits.

Link analysis can be performed in essentially two different ways: whole-graph and sub-graph. These two approaches are discussed below.

Whole graph link analysis means that each document is scored depending on the intrinsic link structure among all the documents in the document set. For example, the search engine Google uses a whole-graph-based version of link analysis (PageRank—U.S. Pat. No. 6,285,999, the contents of which are incorporated herein by reference)) for scoring web pages. This way of performing link analysis is independent of the key words supplied in a search for any of these documents. The scores of all the documents can thus be calculated off-line, independently of the users' activity in searching for information.

Another way of performing link analysis is to restrict the link analysis to a subgraph of the document graph. Here, by subgraph, we simply mean a subset of the documents, and all links between the documents in this subset. There are many possible ways of defining such subgraphs. Most typically, the subgraph is defined by the keywords used in a search query, such that only the documents containing the search keywords are considered (along with the links among this subset of documents). Since the link analysis in this case is dependent on the keywords, the ranking of the documents has to be performed on the fly when the actual search is performed. As with whole-graph link analysis, it is the network context of a document that decides the score obtained through link analysis; and there is no explicit recourse to text relevance, other than using the keywords to define the subgraph.

Text analysis, on the other hand, does not consider a document's network context. Text analysis is an assessment of the relevance of a document, using the text in the document, as evaluated with respect to the search query keywords. Good text relevance analysis is difficult to achieve using a machine—it involves asking a machine to estimate the relevance and/or quality of a given document, with respect to a given set of keywords. Hence state-of-the-art search engines also use link analysis.

Similarity link analysis may be viewed as having elements of both text analysis and link analysis. That is, the similarity of two documents depends obviously on their text; and yet it is a property of pairs of documents, and so introduces some sense of the context of a document. However, a major shortcoming of the conventional similarity analysis technology (apart from the present inventors' co-pending application Ser. No. 11/227,495) is the lack of any application of link analysis to the similarity matrix. Current link analysis methods depend entirely on pre-existing hyperlinks.

In the present inventors' co-pending application Ser. No. 11/227,495 the use of the full similarity matrix is considered. Upon considering the computational issues discussed above, the present inventors have discovered an efficient new way of calculating the whole similarity matrix. This efficient method for obtaining the full document similarity matrix renders possible the use of the entire similarity matrix for the purpose of scoring documents for ranking purposes—even when the document set is very large.

State of the art link analysis is performed on the intrinsic hyperlink matrix, whereas the present inventors' co-pending application Ser. No. 11/227,495 allows for a combination of the hyperlink matrix and the document similarity matrix. The present invention offers a number of additional novel approaches for combining the hyperlink matrix (whole graph or subgraph), together with the document similarity matrix (whole graph or subgraph). These methods are not mentioned in the present inventors' co-pending application Ser. No. 11/227,495 or in any conventional art.

SUMMARY OF THE INVENTION

The present invention includes a device, computer program product and a method for computing the similarity of a set of documents that is much more efficient than the straightforward, exhaustive method described above. The present invention avoids the large, wasted computational effort involved in calculating very small similarity scores. The present invention uses thresholds to stop the similarity calculation between documents, thus ensuring that, with high probability, all document pairs with higher similarity than the thresholds have been found.

The present inventors' co-pending application Ser. No. 11/227,495 describes novel and useful methods for merging link analysis and text analysis, via the use of similarity links and hyperlinks. The present invention includes several different and novel ways of performing link analysis on various combinations of the hyperlink adjacency matrix and the similarity matrix, along with ways for further restricting the analysis and ranking to the whole graph and/or to a subgraph. Thus, the present invention provides several new and useful ways of scoring documents, using both the similarity matrix and the hyperlink adjacency matrix.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows a calculation of pairwise document similarities;

FIG. 5 shows two different approaches for obtaining a single link-analysis scoring vector by using both the hyperlink matrix and the similarity matrix;

DETAILED DESCRIPTION

Calculating Similarity Scores Among a Set of Documents

The method of the present invention begins with calculating similarity scores among a set of documents. This includes the following steps:

1. Constructing a word corpus from the document set.
2. Constructing an inverted index, based on the corpus and on the document set.
3. For each word in the index:
   a. Calculating a word similarity score between the index word and each of the documents in which the word appears.
   b. Sorting the document IDs in decreasing order of word similarity.
   c. Truncating the sorted list of document IDs. This is accomplished by enforcing a word threshold $\tau_{word}$—that is, by discarding documents with word similarity scores less than the word threshold. The resulting truncated, sorted list is termed the index-word document list.
   d. Performing the following operations on the documents in the index-word document list, in order of decreasing word similarity:
      i. For each document D, setting this document in the role of 'first document'—i.e., calculating the similarity of document D to all documents with a lower word similarity rank; and
      ii. Enforcing a similarity threshold $\tau_{SIM}$ by stopping the above-mentioned similarity calculation (step i.) when the similarity between first document D and some document lying lower on the list is less than the similarity threshold.
4. Collecting the resulting document similarity scores—obtained for all pairs of documents which were found to be above threshold in the above procedure—into the similarity matrix. Setting the remaining (uncalculated) matrix elements to be zero.

Each of the preceding steps is discussed below in more detail.

Constructing the word corpus is conventional and known to one skilled in the art (e.g., the previously mentioned Chakrabarti method).

Figure 1:
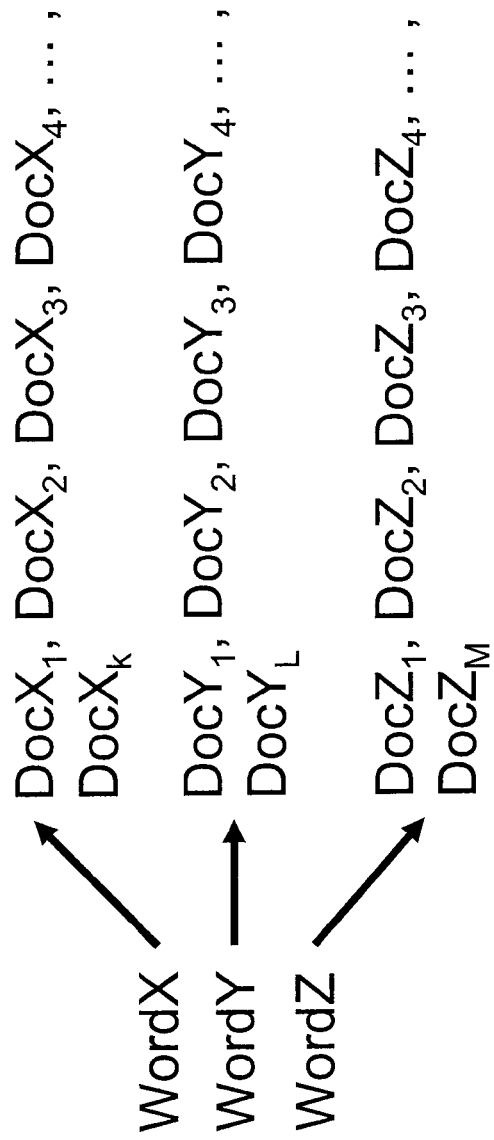
FIG. 1 shows a generic example of an inverted index.

In order to calculate the similarity scores between documents in a given document set, first build an inverted index based on the documents. The inverted index is constructed based on the word corpus; but it has more information. Namely, for each word, the inverted index gives the set of documents in which the word appears. FIG. 1 shows a generic example of an inverted index. For each word in the index there is a list of documents wherein the said word is actually found.

For each word in the index, the word similarity score is calculated. The word similarity score is the similarity score between the index word and each of the documents in which the word appears. The word similarity score is set equal to the index word's normalized word frequency for each of the documents. A sample formula for the normalized word frequency for word w in document $D_i$ is given by $$n_w(D_i) = \frac{N_w(D_i)}{\sum_j N_j(D_i)},$$

where $N_w(D_i)$ is the number of times word w appears in document $D_i$, and j is an index running over all words in the corpus.

Figure 2:
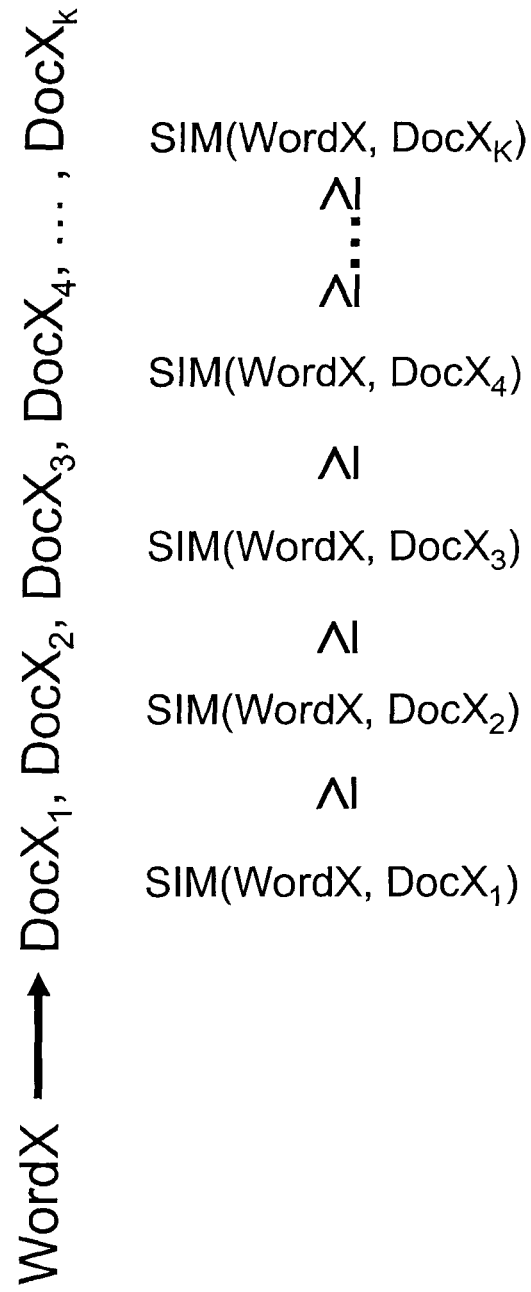
FIG. 2 shows a listing of documents in accordance with a calculated similarity score relative to an index word.

Having calculated the word similarity scores, the next step is, for each index word X, to collect all documents containing this word X, and then to sort all these documents in decreasing order of word similarity score. Hence, the document highest on the list is the document with the highest similarity score to the index word, the second document has the second highest similarity score to the index word, etc. An illustration of this is given in FIG. 2. We call this list, containing all documents which themselves contain a given index word, and sorted with respect to similarity to the given index word, the index-word document list.

The next step is to enforce a word threshold by removing documents from the list for which the word similarity score is less than a predefined word threshold $\tau_{word}$. The word threshold can be set equal to zero, which means that every document in the corresponding index-word document list is included in the succeeding calculation.

Alternatively, a value for $\tau_{word}$ which is greater than zero will remove a larger number of low-word-similarity documents from the similarity calculation. A non-zero value saves computational effort, but entails some risk (which is small for small $\tau_{word}$) of missing some document pairs of significant similarity. That is: if a document D1 has a low word similarity score ($<\tau_{word}$) for every word in the corpus, and yet still has a high similarity to another document D2, the present method will not calculate s(D1,D2) (the similarity between documents D1 and D2), and hence will not find this similar pair.

Note however that high similarity between D1 and D2 implies that D2's word similarity score profile is also fairly 'flat'. That is, if D1 has low weight in every word, and D2 is very similar to D1, then D2 also has fairly low weight in every (or nearly every) word. Thus, for this case, we see that both documents are very unfocused. This case is both highly unlikely for normal searches, and also not very interesting for search, as neither document is expected to be of great interest. Hence, setting $\tau_{word}>0$ (but not too large) can be a highly strategy. Thus, $\tau_{word}$ is a tuning parameter of the method of the present invention.

Figure 3:
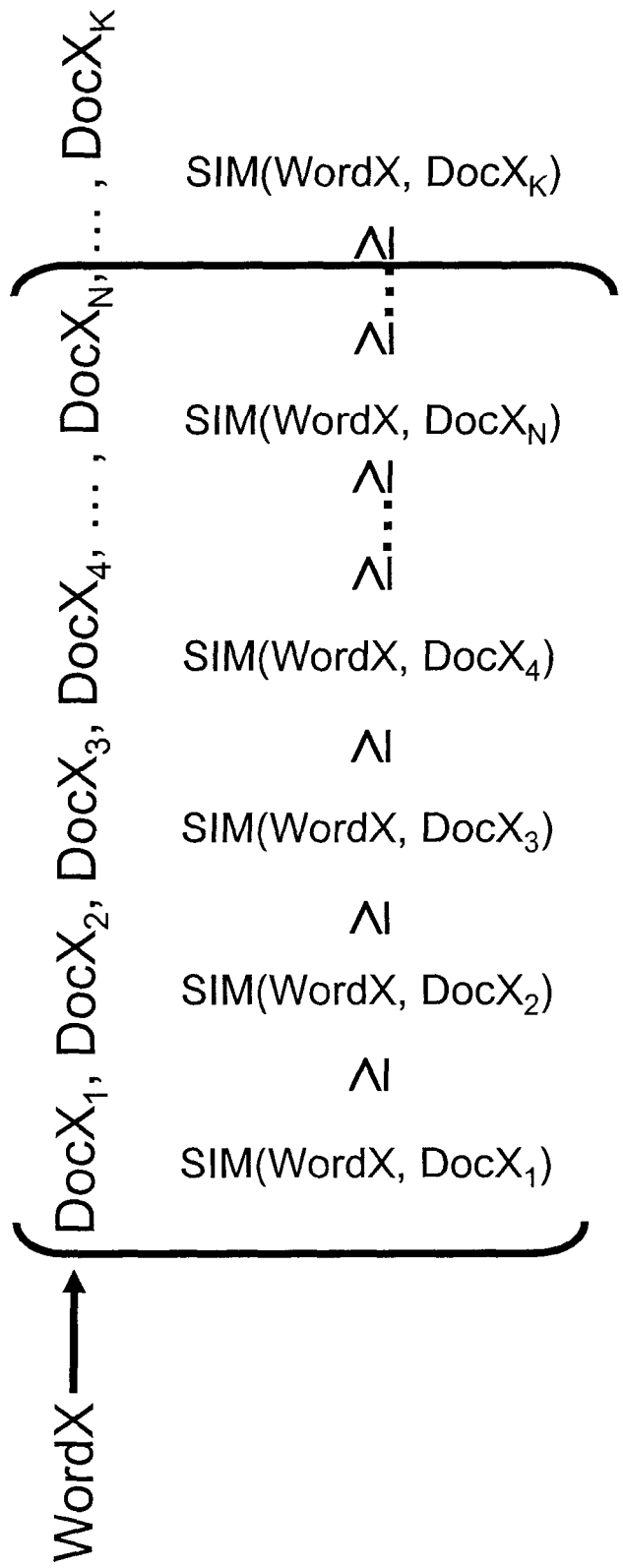
FIG. 3 shows schematically the operation of truncating a sorted document list, so as to exclude those documents with lowest word similarity score with respect to a given word X.

FIG. 3 shows schematically the operation of truncating the index-word document list, so as to exclude those documents with lowest word similarity score with respect to the given word X. The resulting truncated list will still be called the index-word document list.

In the next step of the procedure, document similarities are calculated among the retained documents in the document list for each index word. This is done in the following manner. For each word in the index, the following operation is performed on the documents in the index-word document list, in order of decreasing word similarity. Each retained document on the list is, in turn, considered as "first document". Then, for each choice of first document, the similarity of the first document to all retained documents with rank lower in word similarity is calculated. The calculation is stopped for the present first document (i.e., for the present row of the truncated similarity matrix for index word X) if the obtained document similarity score for two documents is less than the similarity threshold $\tau_{SIM}$. The similarity threshold $\tau_{SIM}$ can be set equal to zero, which means that all the document similarities, for all pairs of documents in the index-word document list, are calculated.

Alternatively, (as with $\tau_{word}$) one can set $\tau_{SIM}>0$. Here (again) the method saves computational effort, while taking a small (for small $\tau_{SIM}$) risk. That is: the process identifies a first document D1 which has word similarity $\geq \tau_{word}$ with respect to a word X. Then the process scans other documents D2, etc. with lower word similarity scores than that of D1 with respect to this same word X. The process assumes that the pairwise similarity score s(D1,D2) decreases roughly monotonically with the word similarity score of document D2. This assumption is based on the following argument. Assume that documents D1 and D2 have identical word number vectors, except for the single word W, where document D1 has a higher value than document D2. Normalizing these two vectors will make them numerically different in every entry, so that the similarity score between the normalized word frequency vectors will be less than one. When the word number vectors are even more different, this effect will be stronger. Hence—all other things being equal—the more different is the word similarity score for a given word between two documents, the less similar are the two documents. This is the basis for our assumption, which is true statistically: documents farther down on the sorted list from the first document D1 are on average likely to be less similar to D1 than higher documents on the list.

Suppose that D1 is the first document in a scan of the index-word document list with respect to word X; that s(D1, Dk)$<\tau_{SIM}$ for some document Dk; and that document D3 is lower on the sorted list than document Dk. The process described here will then scan the list from D1 to Dk, calculating all document similarity scores between D1 and each document found, until it reaches Dk; then the process stops, in the sense that D1 ceases to have the role of first document. The next first document will be the one found just after D1 in the index-word document list; hence D1 will not be considered further for word X. This means that, even if s(D1,D3) is not small, this process will miss finding s(D1,D3) as we scan for word X. However, in order for this process to truly fail to place the similarity score s(D1,D3) in the master similarity matrix, the assumption about the monotonicity of s(D1,D3) with decreasing word similarity score must fail, in just this way, for all words in the corpus that occur in both documents. That is, this scanning process is repeated for every word in the corpus; and s(D1,D3) is considered for calculation for every index word that appears in both D1 and D3. There can be few such common index words, or many. If D1 and D3 have few common index words, yet nevertheless a high similarity, then both documents must have a fairly high word frequency for at least one of these few common words. This will place them both relatively high on the sorted list for that word (or those words); hence s(D1,D3) is likely to be calculated during the scan for this word or these words. If on the other hand D1 and D3 have many common index words, and also a high similarity, then we have to consider two further cases: that both documents have a 'flat' profile, without much weight in any outstanding word or words; or that they do not. In the latter case, arguments similar to the case of few common words apply. In the former case—where both D1 and D3 have flat word profiles—we obtain the same result as we found when we set $\tau_{word}$>0: namely, this case is unlikely, and also uninteresting. Hence, the (assumed not small) s(D1,D3) will be calculated, unless the pair of documents D1 and D3 are so "unlucky" that one of them (D1 or D3) falls below (in word similarity score, i.e., in the sense of FIG. 2) some document which is not very similar to the other (D3 or D1), for every word that these two documents share in the corpus. Such a consistent failure is extremely unlikely (unless of course $\tau_{SIM}$ is too large, and/or both documents have very 'flat' word profiles). Hence, setting $\tau_{SIM}$>0 can be a useful choice in calculating the similarity matrix; and so we retain $\tau_{SIM}$ as a second tuning parameter of the present method.

The calculation of pairwise document similarities is illustrated in FIG. 4. FIG. 4 depicts a similarity matrix for the index-word document list. This matrix is obtained by scanning the documents as ranked with respect to similarity to a given index word X. The italicized, grey boxes in the chart represent document similarity scores that are actually calculated when scanning the index-word document list, which is sorted according to word similarity with respect to word X. In the first row—that is, the row corresponding to the document with highest similarity to word X—only the two first document similarities are entered ($SIM_{1,2}$ and $SIM_{1,3}$), since the document similarity between the first document and document D4 ($SIM_{1,4}$) is less than $\tau_{SIM}$ (and subsequent documents are assumed to also have a lower similarity with D1 than the similarity threshold). In the second row of the chart, document D2 is taken as first document, and its similarity to all lower documents is calculated. For this row, FIG. 4 illustrates a situation where all document similarities between document D2 and lower-ranking documents are above the similarity threshold ($SIM_{2,3}$ thru $SIM_{2,N}$). The third row of the chart (in which D3 takes the role of first document) illustrates a situation where only one document similarity ($SIM_{3,4}$) is above the similarity threshold.

The method then includes a step of aggregating the document similarities into a master similarity matrix. This is done by collecting all the document similarities obtained for each index word in the inverted index. However, only the document similarity scores that exceed the threshold (i.e., only those which are actually calculated) for each word in the corpus are aggregated in the master similarity matrix. The rest of the scores are assumed to be below the acceptance limit given by the similarity threshold, and so are treated as zero. The similarity matrix is a sparsely stored matrix, since the earlier steps omitted calculating many small or zero document similarity scores. The process leading up to the master similarity matrix has the following properties:

Each nonzero entry of the similarity matrix is only computed once. That is, in the scan for word X, each eligible document pair (D1,D2) is checked; and if s(D1,D2) has already been calculated (during a scan of some other word Y), it is not calculated again. Hence there are no repeated calculations of the same document similarity.

There is no approximation made in those document similarity scores that are actually calculated. The only approximation arises when those similarities which are not calculated are assumed to be zero. This assumption is exactly correct when $\tau_{word}=\tau_{SIM}=0$; otherwise, as discussed above, it is approximately true, in a statistical sense. Thus, in short:

Once an entry of the similarity matrix has been computed: 1) that similarity entry is correct, and 2) it will not be calculated again.

In the light of these facts, it is clear that the only source of error in the present method comes from missing some nonzero similarity scores that result from setting one or both of $\tau_{word}$ and $\tau_{SIM}$ to be greater than zero. As discussed above, this source of error is statistically very small for small, nonzero values of $\tau_{word}$ and $\tau_{SIM}$. Thus, the missing scores are also likely to be small. Also, this error is zero if both thresholds are set to zero.

The effect of the new algorithm on searching large electronic archives is indeed substantial. For example, in one test, pairwise similarities among 20.000 documents (constituting the Norwegian version of the online encyclopedia Wikipedia) were tested. Calculating the full similarity matrix (including performing the calculations of the zeros!) amounts to calculating some 200 million similarity entries in the matrix. Setting both thresholds to zero (which amounts to finding all the nonzero document similarities), the above procedure found approximately 800.000 document similarities that were greater than zero. This demonstrates the extreme sparseness of the similarity matrix: less than half a percent of all possible pairs had nonzero similarity measure; hence, over 99% of the possible pairwise document similarity scores need not be calculated for this document set. (This due to the sparseness of the similarity matrix] (Sparse matrix=matrix with few non-zero elements, and only the non-zero elements are stored.) Also, the saving in computation, due to the reduced number of similarities computed, can be even higher if one sets one or more of our two thresholds ($\tau_{word}$ and $\tau_{SIM}$) to some small positive value instead of to zero.

Let us clarify this result, namely, that it is possible to calculate the entire similarity matrix exactly, and still save (in this case) over 99% of the computation time. The important point is simply that the method of this invention never calculates zero similarity values. We recall (see again FIG. 2) that our procedure forms an index-word document list for each word X, and that this list is composed of all documents containing the word X (and none that do not contain the word X). Thus, setting $\tau_{word}=0$ does not result in including documents which lack the given word X; rather, setting $\tau_{word}=0$ results in including all documents which include the word X, no matter how small the word similarity score is. (It can be very small, if the document has very many words, but only includes word X once or a very few times.) Next we note that setting $\tau_{SIM}=0$ will result in calculating the pair of similarities for every pair of documents on the index-word document list for word X. However none of these similarities are zero—because every pair of documents on this list has at least one word in common with a nonzero word frequency, namely the word X. Thus, setting $\tau_{word}=\tau_{SIM}=0$ for every word X will result in calculating all nonzero pairwise document similarities, but no pairwise document similarities which are zero.

It may be that, for some document sets (with mostly very large documents), the savings that comes from setting $\tau_{word}=\tau_{SIM}=0$ will be less than 99%. That is, when most documents are large (much larger than the typical size in our Wikipedia sample), it can happen that most document pairs will have at least one word in common—giving very few document similarity scores which are exactly zero (although many can be very small). Also, even when a huge majority of the similarity scores are exactly zero, it may be that a saving of effort even greater than that obtained by dropping the calculation of all zero elements is desired. For both of these reasons, we have included the possibility of setting either $\tau_{word}$ and/or $\tau_{SIM}$>0.

As previously noted, the second part of the method includes ranking hit lists from searches over an interlinked document set. The starting point for using link analysis for ranking is a document set containing a hyperlink structure. In the standard ranking approach, the link analysis is performed on the directed hyperlink structure of the documents, and the text analysis is performed on the documents themselves. The different scores obtained from link analysis and text analyses are then merged into a combined score, which is used for ranking the documents.

As proposed in the present invention, text analysis is extended to a form of link analysis, through the use of similarity computations. Computing all the similarity scores between documents gives rise to a similarity graph, in which two documents are connected by a symmetric link, if the similarity score between the two said documents is nonzero. The similarity score is used as a link weight. This similarity link structure can be treated by link analysis in the same way as the preexisting, intrinsic directed hyperlink structure, in which documents have pointers pointing to/from other documents. The use of similarity links for link analysis is presented in co-pending application Ser. No. 11/227,495 filed on Sep. 16, 2005.

Performing link analysis consists of finding the principal eigenvector of the link structure matrix. The principal eigenvector of a matrix can be found by using the Power method (see "PageRank Computation and the Structure of the Web: Experiments and Algorithms", by A. Arasu, J. Novak, A. Tomkins, and J. Tomlin. Technical Report, IBM Almaden Research Center, November 2001, the contents of which are incorporated herein by reference). The Power method is an iterative method that iteratively performs matrix multiplications on the first initial estimate of the principal eigenvector. Other methods may also be used.

When using combinations of the two matrices—the hyperlink matrix and the similarity matrix—care is required in how this combining is performed. One possible way of doing so is as follows. The directed hyperlink structure matrix can be added to the similarity matrix (with a possible weight factor for each matrix), where each entry in the two matrices is added together. The eigenvector calculation can then be performed on the resulting matrix. This is illustrated in FIG. 5, the upper panel. In FIG. 5 we denote the directed hyperlink matrix H, and the similarity matrix S. Further, the scoring eigenvector is denoted by the vector $\vec{x}$, and $\lambda$, denotes the matrix eigenvalue of the eigen-computation.

Another possibility is to perform the eigenvector calculations on each of the two matrices, without combining the matrices together. In this case, in order to get a single net link-analysis score for each document, the two resulting eigenvectors may be combined by adding them together (with a possible weight factor for each score). This is illustrated in FIG. 5, lower panel. Summing up so far:

Given the hyperlink matrix H and the similarity matrix S, link analysis can be performed on either one of these two matrices alone (thus choosing not to use the information in the other), giving one scoring vector. Secondly, link analysis can be performed on each matrix separately, and the individual scoring vectors can be combined into one scoring vector (with a possible weight factor for each scoring vector). Thirdly, link analysis can be performed on the sum of the hyperlink matrix H and the similarity matrix S (with a possible weight factor for each matrix), giving one scoring vector. Hence, given the hyperlink matrix H and the similarity matrix S, we find several different strategic choices for performing link analysis: use H alone; use S alone; use both, and combine the two eigenvectors (termed 'vector addition'); or use both, combining the two matrices into a hybrid matrix, and obtaining a single eigenvector from this hybrid matrix (termed 'matrix addition'). Each of these possibilities we will call a "strategic choice" or simply a "strategy".

The number of possible strategies for link analysis is enlarged further by the fact that link analysis, for each matrix H and S, can be performed on the whole graph matrix, or on a subgraph. When one performs link analysis on the whole graph, all the link information among all the documents is taken into account. In contrast, when restricting the link analysis to a (typically, topic-centered) subgraph, one can narrow the analysis down to just one topic, and perform the ranking of all the documents with respect to just that area of interest. That is, link analysis scores documents according to how they lie in a larger context (the graph); and so choosing a subgraph scores them with respect to a more limited, and more focused, context.

Figure 6:
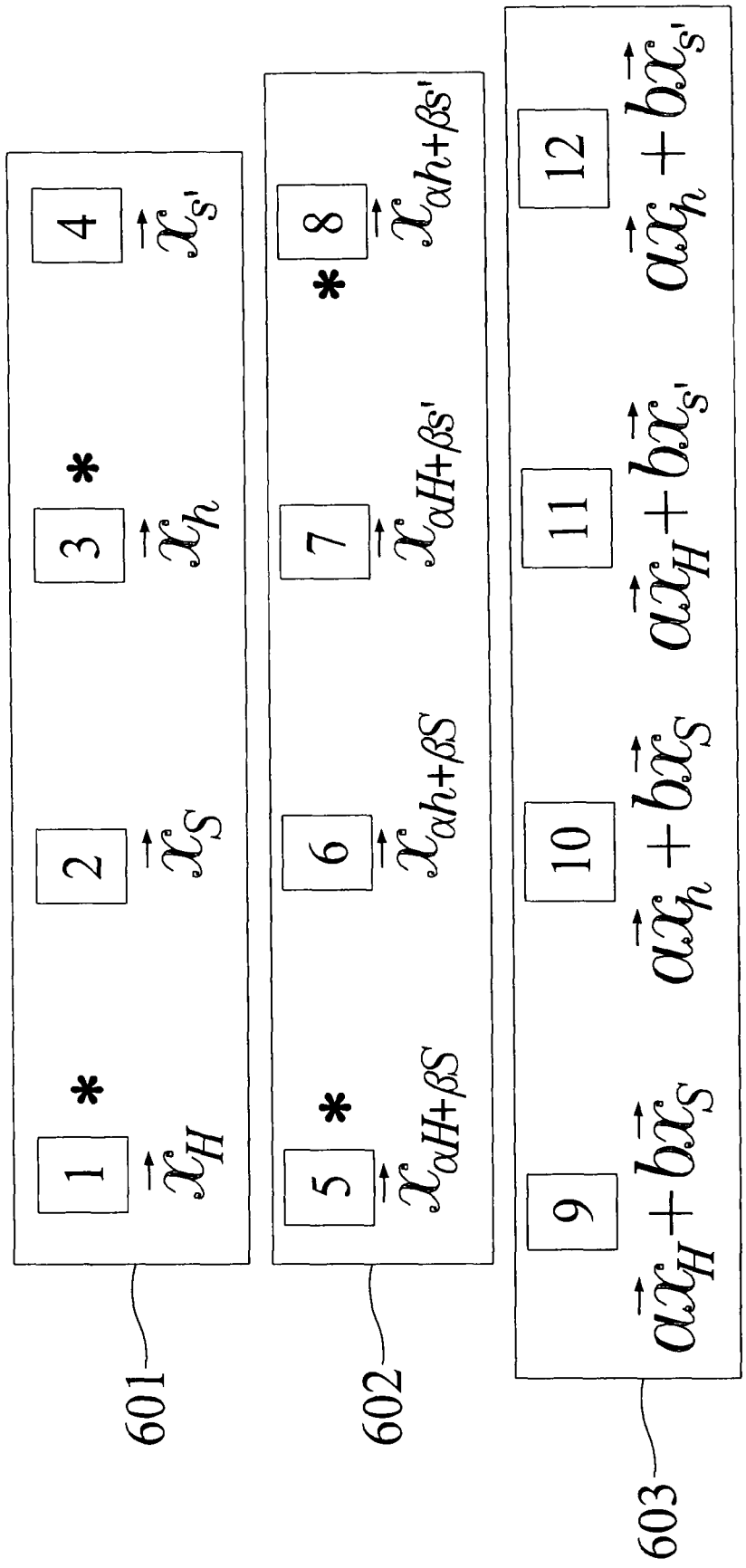
FIG. 6 shows three families of link-analysis scoring vectors, where each such family results from a distinct strategic choice (or set of choices) for exploiting hyperlink and similarity link information.

Allowing the possibility of using subgraphs then expands the set of strategic choices discussed earlier (where we assumed use of the whole graphs H and S). The total set of choices then becomes: (a) one graph (and which one) or two; (b) for each graph chosen, whole graph or subgraph; and (c) in the case of two graphs, matrix addition or vector addition. A set of choices which addresses all of these questions (a)-(c) will be called a "detailed strategy" for link analysis. We find in total twelve distinct detailed strategies, which may be presented in terms of three families (FIG. 6):

The first row of FIG. 6 (box 601) stems for choosing to use only a single matrix for link analysis. That is, this is the case of performing the link analysis on the whole graph structure, or a subgraph structure, for either the directed hyperlink matrix or the similarity matrix (but not both). Clearly this gives four possible detailed strategies, which are numbered 1-4 in FIG. 6. The result for each detailed strategy in this family is a single score vector obtained from a single matrix.

The second row (box 602) is the case of matrix addition: adding different combinations of the whole graph and subgraph for the directed hyperlink matrix and the similarity matrix (with a possible weight factor for each matrix), and performing link analysis on the resulting summed matrix, to obtain a single link analysis score. There are four detailed strategies (numbered 5-8) in this row. The weight factors make possible the tuning of the importance given to each of the matrices. For example, if more emphasis should be put on the hyperlink matrix, then the weight factor $\alpha$ in front of the hyperlink matrix H should be larger than the weight factor $\beta$ in front of the similarity matrix S. The result for each detailed strategy in this family is a single score vector, obtained from combining two matrices.

The third row (box 603) is the case of vector addition: performing link analysis directly on the different whole graph and/or subgraph versions of the directed hyperlink matrix and the similarity matrix, and then combining the resulting eigenvectors (with a possible weight factor for each scoring vector, as represented by the tuning parameters a and b in the figure) to give a net link-analysis scoring vector. There are four detailed strategies (numbered 9-12) in this row. The result for each detailed strategy in this family is a single score vector, obtained from combining two eigenvectors.

Note that, in each of these cases, "performing link analysis" is defined as "obtaining the dominant eigenvector, and extracting document scores from this eigenvector".

As shown in FIG. 6, the directed hyperlink matrix comes in two versions: H denotes the whole graph version, while h denotes the subgraph version. Likewise, the similarity matrix also comes in two versions; S denotes the whole graph version, and s' denotes the subgraph version. Performing link analysis on these four different matrices individually gives rise to four scoring vectors, one for each matrix. Next, two matrices can be added together (with a possible weight factor for each matrix), giving rise to four possible 'hybrid' matrices, and hence to another four distinct scoring vectors. Lastly, the individual scoring vectors for each of the four non-hybrid matrices can pairwise be added together (with a possible weight factor for each scoring vector), adding another four scoring vectors to the set of possible ways of obtaining scoring vectors from the four matrices H, h, S, and s'. Thus there are 12 possible ways (detailed strategies 1-12) for obtaining document scoring vectors from the four matrices H, h, S, and s'.

In FIG. 6, four of the twelve detailed strategies (1, 3, 5, and 8) are marked with stars. These methods are disclosed in co-pending application Ser. No. 11/227,495, and/or in other prior art. The remaining eight detailed strategies are new.

Now, for clarity, we describe explicitly each of the twelve detailed strategies in order. We retain the grouping into families for convenience.

Family I (Box 601):
In box 601, four detailed strategies are shown (1, 2, 3, 4). For these detailed strategies the link analysis is performed on one single matrix.
  In detailed strategy 1, link analysis is performed on the full, directed hyperlink matrix H.
  In detailed strategy 2, link analysis is performed on the full similarity matrix S.
  In detailed strategy 3, link analysis is performed on a subgraph of the directed hyperlink matrix h.
  In detailed strategy 4, link analysis is performed on a subgraph of the similarity matrix s'.

For each case in box 601, a single link-analysis scoring vector is obtained and used in the subsequent document ranking.

Family II (Box 602):
In box 602, four detailed strategies are shown (5, 6, 7, 8). For these detailed strategies the link analysis is performed on a combined matrix obtained by adding together full-graph and/or subgraph versions of the hyperlink and the similarity matrix (with a possible weight factor for each matrix).
  In detailed strategy 5, link analysis is performed on the combined matrix obtained as the sum of the full, directed hyperlink matrix H and the full similarity matrix S.
  In detailed strategy 6, link analysis is performed on the combined matrix obtained as the sum of a subgraph h of the directed hyperlink matrix and the full similarity matrix S.
  In detailed strategy 7, link analysis is performed on the combined matrix obtained as the sum of the full, directed hyperlink matrix H and a subgraph s' of the similarity matrix.
  In detailed strategy 8, link analysis is performed on the combined matrix obtained as the sum of a subgraph h of the directed hyperlink matrix and a subgraph s' of the similarity matrix.

For each case in box 602, a single link-analysis scoring vector is obtained and used in the subsequent document ranking.

Family III (Box 603):
In box 603, four detailed strategies are shown (9, 10, 11, 12). For these detailed strategies the link analysis is performed on two matrices independently.
  In detailed strategy 9, link analysis is performed separately on each of the full, directed hyperlink matrix H and the full similarity matrix S, resulting in two scoring vectors.
  In detailed strategy 10, link analysis is performed separately on each of a subgraph h of the directed hyperlink matrix and the full similarity matrix S, resulting in two scoring vectors.
  In detailed strategy 11, link analysis is performed separately on each of the full, directed hyperlink matrix H, and a subgraph s' of the similarity matrix, resulting in two scoring vectors.
  In detailed strategy 12, link analysis is performed separately on each of a subgraph h of the directed hyperlink matrix and a subgraph s' of the similarity matrix, resulting in two scoring vectors.

For each case in box 603, the link analysis of the two matrices returns two scoring vectors. These two scoring vectors are then combined (with a possible weight factor for each scoring vector) into a single combined link-analysis scoring vector, which is used in the subsequent document ranking.

Now we place these ideas in the context of a search service. It is assumed that, in general, information about two types of links between documents are available to the search service: directed hyperlinks (stored in the matrix H), and similarity links (stored in the matrix S).

Figure 7:
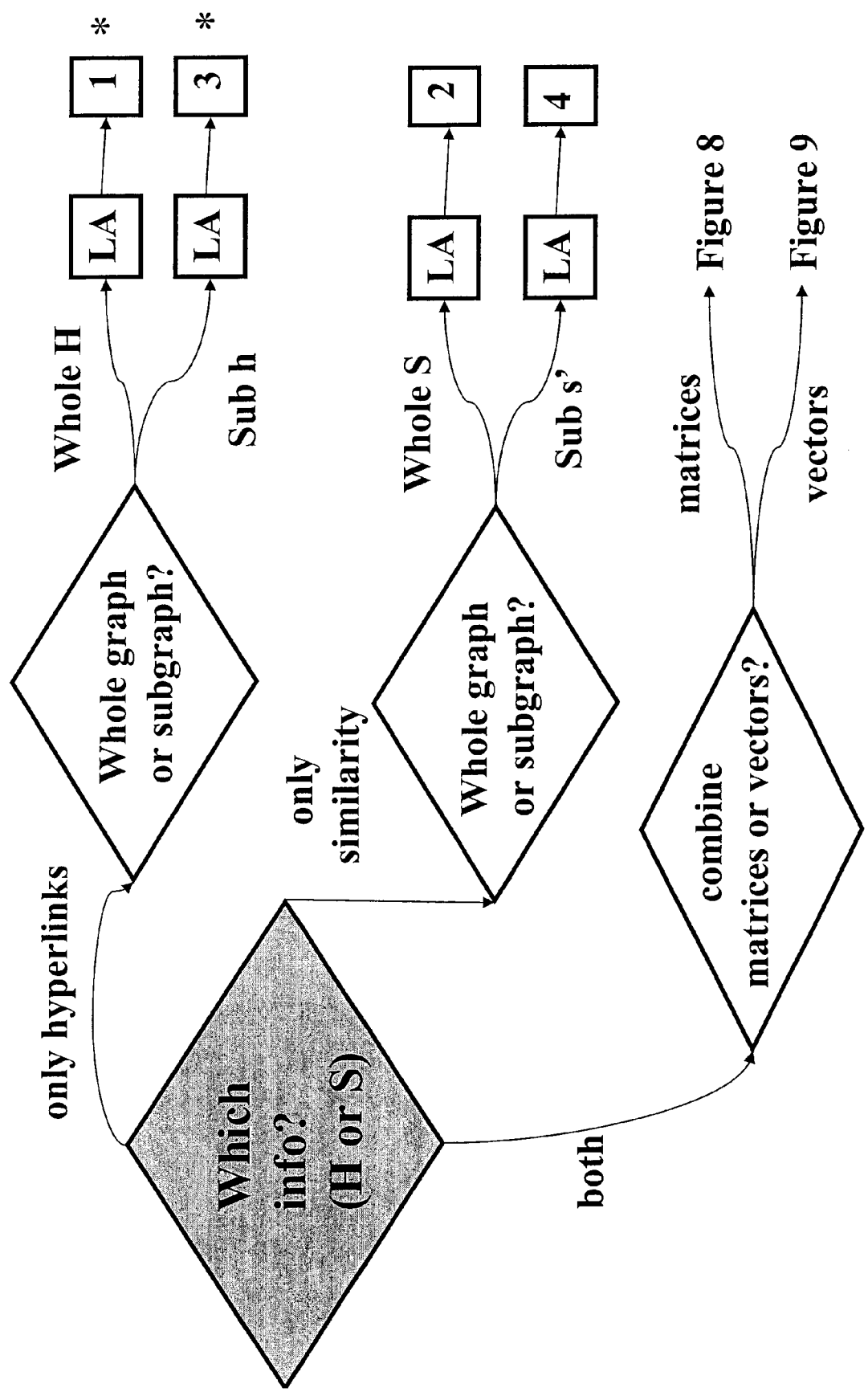
FIG. 7 shows several primary strategic choices, regarding which information to use in link analysis, and how it is to be used.

FIG. 7 illustrates the three principal strategy choices the search service can take. That is, given both hyperlink and similarity-link information, which information is to be used in performing link analysis? The choices shown are: (i) use only hyperlinks H; (ii) use only similarity links S; (iii) use both. We expect that the service provider will make this choice, rather than the user.

Choosing only to use hyperlinks may be appropriate for document sets with a well-developed hyperlink structure. Given this choice however, one has the further choice: whole graph or subgraph?

First we consider use of the whole graph—which is detailed strategy 1 in FIG. 6. This choice is typically of the kind which is made by the service provider. The PageRank algorithm for example uses the whole graph for link analysis. This means that the link analysis score for a document D depends on that document's position relative to all other documents. It is clear from the example of PageRank that this choice can be useful.

However, one can also choose to use a subgraph h. This is detailed strategy 3 in FIG. 6. The HITS algorithm uses for example a topic-focused subgraph as the starting point for its link analysis method. Also, co-pending application Ser. No. 11/227,495 discusses the choice of using a subgraph, in the context of "refining" a search. That is, a user can initiate a topic-focused search, using as input the hit list from a previous (whole-graph-based) search. This hit list defines the subgraph which is to be used for link analysis (and further searching). Application Ser. No. 11/227,495 does not explicitly mention use of the subgraph h alone; however this may be a useful strategy, either as fixed by the service provider (e.g., one using HITS or similar), or user-initiated, as in the process of search refinement.

Now we suppose instead that the choice is made to use only similarity information. This choice is of course attractive whenever hyperlink information is absent, unreliable, or very limited. We assume that this choice is also made by the service provider.

Given then only similarity links for link analysis, one must choose to use the whole graph or the subgraph (as shown in FIG. 7). Using the whole graph may give good results if the document set itself is somewhat focused—for example, the set of internal documents for a company. This choice is detailed strategy 2 in FIG. 6; it is expected to be made by the service provider.

Choosing instead to use a subgraph of the similarity links for link analysis gives detailed strategy 4 of FIG. 6. This choice may be made by the service provider—for example, if the document set as a whole is very unfocused, then using the whole similarity graph S may give too much weight to "generic" results. However, the choice to use a similarity subgraph s' may also be also be made by the user. For instance, the choice to use s' may be made in the context of refining a search, as discussed above. Refining of search is presented in co-pending application Ser. No. 11/227,495; however this application does not explicitly mention the use of only a similarity subgraph s'.

We now come to the third principal strategy choice, namely, to use both kinds of link information in link analysis. This choice will often be favored whenever both kinds of information are available. We expect that it is made by the service provider. Given however two types of links (two graphs), one must then choose how to exploit these two graphs in link analysis. Two technical options are possible (as discussed above, and as shown in FIG. 7): (iv) one can combine the two matrices into a single matrix, composed of both directed hyperlinks and undirected similarity links, and then perform link analysis on the resulting asymmetric matrix (matrix addition strategy); or (v) one can perform link analysis on each matrix separately, obtaining thus two vectors of scores. In this second case (vector addition strategy), one gets a single vector of LA scores from a weighted sum of the two vectors so obtained. Thus either choice (iv) or (v) gives finally a single vector of link analysis scores, one for each document, to be used in further ranking of the documents. Since the choice between (iv) and (v) is based on technical considerations, we expect this choice also to be made by the service provider.

Figure 8:
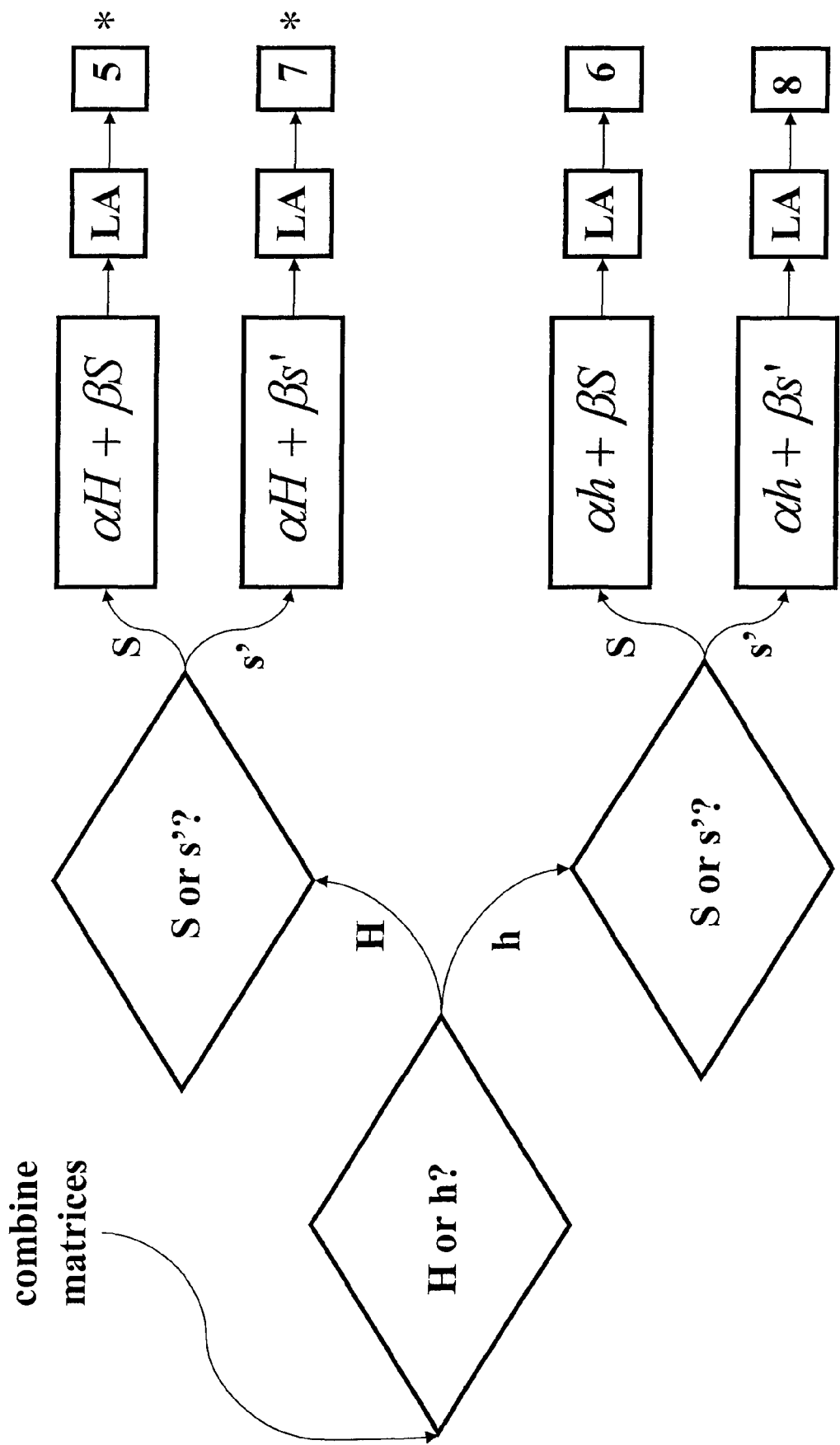
FIG. 8 gives flow charts for the four detailed strategy choices involving combining the two types of matrix (hyperlinks and similarity), and then using link analysis to obtain document scores.

We first consider choice (iv): combining matrices. The detailed strategies which may follow from this choice are shown in FIG. 8. The four detailed strategies follow from simple logic, as presented earlier: one wishes to combine a hyperlink graph with a similarity graph, but for each graph one faces the further choice of using whole graph or subgraph.

Choosing the whole graphs for each case (that is, H and S) gives the top line of FIG. 8; this is detailed strategy 5 of FIG. 6. As noted earlier, for this choice and for all choices in FIG. 8, the matrices may be summed with weights, allowing the service provider to tune the performance of the method. Choosing to use all of H and all of S may give good results in many cases, whether or not the document set has a well developed hyperlink structure. This method is presented in co-pending application Ser. No. 11/227,495.

Another choice is to use the full graph H combined with the subgraph s'. This is the second line of FIG. 8 (detailed strategy 7 of FIG. 6). This strategy may give better results than the previous strategy, since it puts extra link weight between documents in a topic-focused subgraph, while at the same time providing some global perspective on the importance of the documents, via H. Hence, this choice may be made by the service provider as a preferred strategy. However, it is also possible to offer this choice to the user, as a form of refinement of search in which only the similarity link graph is refined. In either case (provider strategy or user election), the refinement from S to s' must be done in real time, based on the hit list from a previous, unrefined search.

Another choice is to use the subgraph h combined with the full graph S. This is the third line of FIG. 8 (detailed strategy 6 of FIG. 6). In general cases (as discussed in the previous paragraph), using the full hyperlink graph H is expected to be useful, as it includes the "citation" or "recommendation" network among all documents; and using the subgraph s' gives extra weight to those documents which are most central with respect to a given topic. Here however, in detailed strategy 6, we have made the opposite choices: subgraph h and full graph S. This choice may give good performance in special circumstances. For example, it may occur that hyperlink information is available for the whole document set, but there is evidence of hyperlink "spamming" over much (but not all) of the document set—hence one chooses to retain only a subgraph h. At the same time, one may wish to exploit a global view of the document set, and so retain the full similarity matrix S. These considerations are of the kind made by the service provider, rather than by the user.

Finally, we consider using the subgraph h combined with the subgraph s'. This is the fourth line of FIG. 8 (detailed strategy 8 of FIG. 6). This choice may give good performance in many cases. It may be made by the service provider, such that each search is automatically refined before the searcher is even presented with the results; or it may be made by the user, as a refinement of a previous, unrefined search. This choice of link analysis method has been presented in co-pending application Ser. No. 11/227,495, in the context of refinement.

Figure 9:
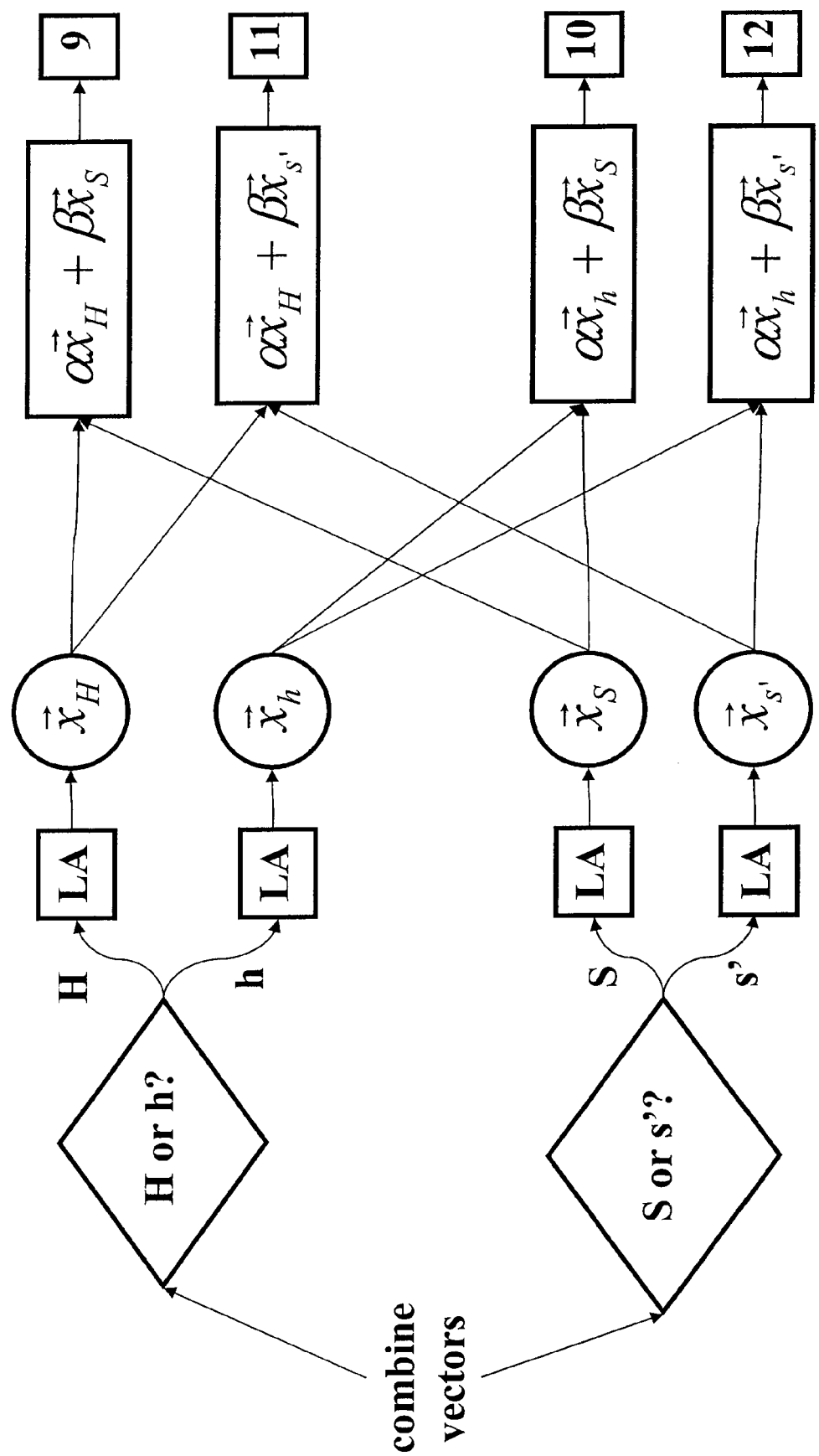
FIG. 9 gives flow charts for the four detailed strategy choices involving first using link analysis on each of two types of matrix (hyperlinks and similarity), and then combining the two resulting vectors of scores to get a single set of document scores.

FIG. 9 presents the four possible detailed strategies for link analysis which are derived from the choice to combine vectors rather than matrices. The option of extracting a scoring vector from each of two matrices, and then combining the results into a single scoring vector, gives different results in general from those obtained by first combining the matrices (FIG. 8) and then obtaining a single scoring vector from the combined matrix. Furthermore, this option (vector addition—that is, LA for two matrices, followed by combining the scoring vectors) is not discussed in co-pending application Ser. No. 11/227,495; hence it is new. The same four choices (of pairs of matrices) are possible for this option as for the matrix-combining option; however the order of operations is different (compare FIGS. 8 and 9). The choice between, on the one hand, matrix addition followed by extraction of a single scoring vector, and on the other hand, extracting two scoring vectors from two matrices and then adding these vectors, is a technical choice, to be made by the service provider. Either choice may give good results. Note that, as shown in FIG. 9, weights may be used when summing the two scoring vectors.

The practical and performance considerations involved in choosing the pair of matrices to be used in a vector addition strategy are essentially the same as those given for choosing the pair of matrices for matrix addition. Also, considerations regarding user involvement (or not) in these choices are the same as for matrix addition. Hence we do not repeat the previous discussion (given in reference to FIG. 8) here. The detailed strategy numbers (9-12) corresponding to those in FIG. 6 are shown for each vector addition strategy in FIG. 9.

In summary, the present invention involves novel methods for link analysis, to be used in the ranking of documents during search and navigation. These novel methods involve use of a set of similarity links between documents, combined into a similarity matrix S. FIG. 5 shows the procedural differences that entail between the method we call matrix addition, and that we call vector addition. FIG. 6 gives a summary (and a numbering) of the twelve detailed strategies that may be employed, given the availability of both hyperlink and similarity link information. Finally, FIGS. 7-9 show in detail the strategic choices that may be made in exploiting this information for link analysis. Each completed set of strategic choices in FIGS. 7-9 are given a number, corresponding to the numbering scheme given in the summary FIG. 6. Those detailed strategies numbered 1, 3, 5, and 8 have been previously presented, in co-pending application Ser. No. 11/227, 495, and/or in other sources; these are marked with an asterix in FIGS. 6, 7, and 8. The remaining detailed strategies—numbered 2, 4, 6, 7, and 9 to 12 inclusive—are, to our knowledge, new.

All of the strategies described here which make use of the similarity graph (whole graph or subgraph) can benefit from the novel and efficient method, as presented in this invention, for determining and calculating the nonzero entries of this matrix.

The preceding paragraphs describe novel and useful methods for both developing a similarity matrix and exploiting the similarity matrix so developed. However, the preceding methods of exploitation (e.g., the methods shown in FIGS. 6-9) may also be applied to a conventionally derived similarity matrix. A conventional similarity matrix is derived as follows. Assuming a set of documents and a conventional method for calculating the similarity S(D1,D2) between any pair (D1,D2) of documents (i.e., S(D1,D2) is a number). The similarities are calculated for all possible pairs of documents and are collected into a matrix. This matrix is a conventional similarity matrix, with one row and one column for each document, so that the number S(D1,D2) is found in the D1 row and D2 column. Also, the conventional similarity matrix is symmetric: S(D1,D2)=S(D2,D1). This is because the similarity of a pair depends only on which pair. As noted at the beginning of this paragraph, the methods of FIGS. 6-9 may be usefully applied to a conventional similarity matrix.

The present invention is implemented on a computer-based device and with a computer-based product. The computer-based device may be a plurality of devices connected over a network. A discussion on how computers and network work is presented in "How Computers Work," Millennium Edition, Ron White, McMillan Computer Publishing, 1999, the entire contents of which is incorporated by reference.

The invention claimed is:

1. A computer-based method of electronic document searching, navigating or retrieving documents in a set of electronic documents, comprising:

analyzing the set of documents based on at least a portion of a similarity graph and at least a portion of a hyperlink graph constructed from hyperlinks between the set of documents, wherein:

said step of analyzing the set of documents using said at least a portion of the similarity graph and at least a portion of a hyperlink graph includes one of:

combining the at least a portion of the similarity graph and the at least a portion of the hyperlink graph into a single, hybrid graph by adding at least a portion of a hyperlink matrix to the at least a portion of a similarity matrix, and determining a score for the documents in the set of documents from an eigenvector of a matrix of the hybrid graph, the hybrid graph comprising one of:

the whole similarity graph and a subgraph of the hyperlink graph, and a subgraph of the similarity graph and the whole hyperlink graph; and obtaining two eigenvectors of scores, one from each of the at least a portion of the similarity graph and the at least a portion of the hyperlink graph, and determining a net score for each document in the set of documents from a weighted combination of said two eigenvectors of scores, said method of searching, navigating or retrieving further comprising:

ranking at least one of the set of documents against another of the set documents with corresponding document scores; and at least one of electronically searching said set of electronic documents, navigating said set of electronic documents, and retrieving from said set of electronic documents based on said ranking.

2. The method of claim 1, further comprising:

building said similarity graph, comprising:

representing the similarity graph as a similarity matrix for said set of electronic documents, said step of representing comprising:

electronically constructing and storing a word corpus from said set of electronic documents, each document in said set of electronic documents having a corresponding document ID;

electronically constructing an inverted index, based on the electronically constructed word corpus and set of electronic documents;

for each word in the inverted index, obtaining a plurality of document similarity scores by:

electronically sorting document IDs of said set of electronic documents according to a word similarity score to form a sorted set of document IDs, each document ID in said sorted set corresponding uniquely to a document in said set of electronic documents, where said word appears in each document represented in said sorted set, said sorted set being an index-word document list, and electronically calculating a document similarity score between each pair of documents identified in said index-word document list, for which said pair of documents meets a set of threshold criteria;

collecting, into said similarity matrix, the document similarity scores calculated;

assigning a value from said similarity matrix as a link weight between a corresponding two documents identified in said index-word document list; and treating all remaining matrix elements of said similarity matrix as zero.

3. The method of claim 1, further comprising:

identifying a principal eigenvector of a link structure matrix; and assigning, for each document, a corresponding document weight in the principal eigenvector as a corresponding document link-analysis score.

4. The method of claim 1, further comprising:

when hyperlinks exist between said electronic documents, performing matrix addition of said similarity matrix with an adjacency matrix corresponding to an intra-document hyperlink structure, where said matrix addition comprises one of:

adding a directed hyperlink structure matrix to said similarity matrix to form a hybrid link structure matrix; and adding a directed hyperlink structure matrix to said similarity matrix to form said hybrid link structure matrix, wherein one of said directed hyperlink structure matrix and said similarity matrix is weighted with a weight factor.

5. The method of claim 4, further comprising:

performing link analysis on said hybrid link structure matrix, and where said step of performing link analysis comprises identifying a principal eigenvector of said hybrid link structure matrix, and assigning, for each document, a corresponding document weight in the principal eigenvector as a document link-analysis score.

6. The method of claim 1, further comprising:
performing link analysis, wherein said step of performing link analysis comprises:
- identifying a principal eigenvector of said similarity matrix;
- identifying a principal eigenvector of a directed hyperlink structure matrix; and
- one of
  - adding said principal eigenvector of said similarity matrix to said principal eigenvector of a directed hyperlink structure matrix to form a net link-analysis score for each document; and
  - adding said principal eigenvector of said similarity matrix to said principal eigenvector of a directed hyperlink structure matrix to form a net link-analysis score for each document, wherein one of said principal eigenvector of said similarity matrix and said principal eigenvector of a directed hyperlink structure matrix is weighted with a weight factor.

7. The method of claim 1, further comprising:
performing link analysis over one of a whole graph and a subgraph of said similarity matrix;
identifying a principal eigenvector of one of a whole graph and a subgraph of said similarity matrix; and
assigning, for each document, a corresponding document weight in said principal eigenvector as a corresponding document link-analysis score.

8. The method of claim 4, wherein said matrix addition comprises one of:
- adding one of a whole graph and a subgraph of a directed hyperlink structure matrix to one of a whole graph and a subgraph of said similarity matrix to form a hybrid link structure matrix; and
- adding one of a whole graph and a subgraph of a directed hyperlink structure matrix to one of a whole graph and a subgraph of said similarity matrix to form said hybrid link structure matrix, wherein one of said directed hyperlink structure matrix to said similarity matrix is weighted with a weight factor.

9. The method of claim 8, further comprising:
performing link analysis on said hybrid link structure matrix, and where said step of performing link analysis comprises identifying a principal eigenvector of said hybrid link structure matrix, and where, for each document, a corresponding document weight in the principal eigenvector is assigned as a corresponding link-analysis score.

10. The method of claim 6, wherein said step of identifying a principal eigenvector of said similarity matrix comprises:
identifying a principal eigenvector of one of a whole graph and a subgraph of said similarity matrix, and wherein said step of identifying a principal eigenvector of said directed hyperlink structure matrix comprises identifying a principal eigenvector of one of a whole graph and a subgraph of said directed hyperlink structure matrix.

11. The method of claim 7, wherein said link-analysis score for a document indicates a quality or importance of said document.

12. The method of claim 9, wherein said link-analysis score for a document indicates a quality or importance of said document.

13. The method of claim 10, wherein said link-analysis score for a document indicates a quality or importance of said document.

14. The method of claim 1, wherein the similarity graph is constructed with a method which avoids calculating zero or low values of similarity.

15. A non-transitory computer readable medium including stored thereon a computer program product containing instructions configured to cause a computing device to execute the method recited in one of claims 1-14.

16. The method of claim 1, wherein at lest one of the at least a portion of the hyperlink matrix and the at least a portion of the similarity matrix are multiplied with a weight factor prior to combination into a single, hybrid graph.

* * * * *